(12) United States Patent
Akkarakaran et al.

(10) Patent No.: US 9,350,511 B2
(45) Date of Patent: May 24, 2016

(54) EFFICIENCY OF TRAFFIC COMMUNICATION OVER A DOWNLINK (DL) CHANNEL

(71) Applicant: QUALCOMM Incorporated, San Diego, CA (US)

(72) Inventors: Sony Akkarakaran, Poway, CA (US); Sharad Deepak Sambhwani, San Diego, CA (US); Liangming Wu, Beijing (CN); Peyman Razaghi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 14/454,660

(22) Filed: Aug. 7, 2014

(65) Prior Publication Data

US 2015/0043487 A1 Feb. 12, 2015

Related U.S. Application Data

(60) Provisional application No. 61/864,375, filed on Aug. 9, 2013.

(51) Int. Cl.

| H04W 4/00 | (2009.01) |
|---|---|
| H04L 5/00 | (2006.01) |
| H04L 27/26 | (2006.01) |
| H04W 28/06 | (2009.01) |

(Continued)

(52) U.S. Cl.
CPC .......... *H04L 5/0053* (2013.01); *H04L 27/2602* (2013.01); *H04L 5/0016* (2013.01); *H04W 28/06* (2013.01)

(58) Field of Classification Search
CPC ... H04L 5/0053; H04L 27/2602; H04L 5/003; H04L 5/0016; H04W 28/06; H04W 72/04; H04W 88/08; H04W 76/00; H04W 84/08; H04W 76/02

USPC ................. 370/329, 341, 431, 464
See application file for complete search history.

(56) References Cited

U.S. PATENT DOCUMENTS

| 6,693,952 B1 * | 2/2004 | Chuah ................. H04J 13/0044 370/335 |
|---|---|---|
| 2003/0091003 A1 | 5/2003 | Wang et al. |
| 2004/0252662 A1 * | 12/2004 | Cho ...................... H04W 74/08 370/329 |

FOREIGN PATENT DOCUMENTS

| EP | 1104126 A1 | 5/2001 |
|---|---|---|
| EP | 1648106 A1 | 4/2006 |

OTHER PUBLICATIONS

International Search Report and Written Opinion—PCT/US2014/050410—ISA/EPO—Nov. 4, 2014.

(Continued)

*Primary Examiner* — Brenda H Pham
(74) *Attorney, Agent, or Firm* — Loza & Loza LLP

(57) ABSTRACT

An apparatus and method for communication including determining an assignment for one of a plurality of symbol durations in a format combination; determining if at least one bit from one or more first upper channels is available if the assignment is associated with the one or more first upper channels and occupying the one of the plurality of symbol durations with the at least one bit, or if unavailable, occupying the one of the plurality of symbol durations with at least one bit from one or more second upper channels or another first upper channel, wherein the first upper channels and the second upper channels are different; and disabling transmission of format information; or including enabling a BTFD hypothesis testing mode; receiving one or more symbol durations on a physical channel; and attempting to decode the received symbol duration with a first hypothesis that a DCCH channel is not transmitted.

20 Claims, 10 Drawing Sheets

(56) References Cited

OTHER PUBLICATIONS

Qualcomm Incorporated: "TP on DL DCH Enhancements", 3GPP Draft, R1-132444, TP DL DCH Enhancements, 3rd Generation Partnership Project (3GPP), Mobile Competence Centre, 650, Route Des Lucioles, F-06921, Sophia-Antipolis Cedex, France, vol. RAN WG1, no. Fukuoka, Japan; May 20, 2013-May 24, 2013, May 12, 2013, XP050698360, 15 pages, Retrieved from the Internet: URL:http://www.3gpp.org/ftp/tsg_ran/WG1_RL1/TSGR1 73/Docs/.

* cited by examiner

| VOCODER | SLOT FORMAT #i | CHANNEL BIT RATE (kbps) | CHANNEL SYMBOL RATE (ksps) | SF | BITS / SLOT | DPDCH BITS / SLOT | | DPCCH BITS / SLOT | | | TRANSMITTED SLOTS PER RADIO FRAME $N_{Tr}$ |
|---|---|---|---|---|---|---|---|---|---|---|---|
| | | | | | | $N_{DATA1}$ | $N_{DATA2}$ | $N_{TPC}$ | $N_{TFCI}$ | $N_{PILOT}$ | |
| AMR 5.9K | 25 | 30 | 15 | 256 | 20 | 2 | 16 | 2 | 0 | 0 | 15 |
| AMR 12.2K | 26 | 60 | 30 | 128 | 40 | 6 | 32 | 2 | 0 | 0 | 15 |

FIG.8

EFFICIENCY OF TRAFFIC COMMUNICATION OVER A DOWNLINK (DL) CHANNEL

CROSS-REFERENCE TO RELATED APPLICATIONS

This application claims priority to and the benefit of U.S. provisional patent application No. 61/864,375 filed in the United States Patent And Trademark Office on Aug. 9, 2013, the entire content of which is incorporated herein by reference.

TECHNICAL FIELD

Aspects of the present disclosure relate generally to wireless communication systems, and more particularly, to communication (e.g., traffic communication) over a downlink (DL) channel.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Disclosed is an apparatus and method for improving efficiency of communication (e.g., traffic communication such as voice transmission) over a downlink (DL) channel. Accordingly, a method for communication over a downlink channel including determining an assignment for one of a plurality of symbol durations in a format combination; determining if at least one bit from one or more first upper channels is available if the assignment is associated with the one or more first upper channels; if available, occupying the one of the plurality of symbol durations with the at least one bit from the one or more first upper channels, or if not available, occupying the one of the plurality of symbol durations with at least one bit from one or more second upper channels or another first upper channel, wherein the one or more first upper channels and the one or more second upper channels are different sets of upper channels; and disabling transmission of format information associated with the format combination.

Accordingly, a method for communication over a downlink channel including enabling a blind transport format detection (BTFD) hypothesis testing mode; receiving one of a plurality of symbol durations on a physical channel; and attempting to decode the one of the plurality of symbol durations with a first hypothesis that a DCCH channel is not transmitted, and wherein if the attempting is not successful, further comprising decoding the one of the plurality of symbol durations with a second hypothesis that the DCCH channel is transmitted.

Accordingly, an apparatus for communication over a downlink channel including a memory for storing at least one bit from one or more first upper channels or at least one bit from one or more second upper channels; and at least one processor coupled to the memory, the at least one processor configured to perform the following: determine an assignment for one of a plurality of symbol durations in a format combination; determine if at least one bit from the one or more first upper channels is available if the assignment is associated with the one or more first upper channels; if available, occupy the one of the plurality of symbol durations with the at least one bit from the one or more first upper channels, or if not available, occupy the one of the plurality of symbol durations with at least one bit from the one or more second upper channels or another first upper channel, wherein the one or more first upper channels and the one or more second upper channels are different sets of upper channels; and disable transmission of format information associated with the format combination.

Accordingly, an apparatus for communication over a downlink channel including a memory for storing at least one blind transport format detection (BTFD) hypothesis algorithm; and at least one processor coupled to the memory, the at least one processor configured to perform the following: enable a blind transport format detection (BTFD) hypothesis testing mode; receive one of a plurality of symbol durations on a physical channel; and attempt to decode the one of the plurality of symbol durations with a first hypothesis that a DCCH channel is not transmitted; and wherein if the attempting is not successful, the at least one processor is further configured to decode the one of the plurality of symbol durations with a second hypothesis that the DCCH channel is transmitted.

Accordingly, an apparatus for communication over a downlink channel including a memory for storing at least one bit from one or more first upper channels or at least one bit from one or more second upper channels; means for determining an assignment for one of a plurality of symbol durations in a format combination; means for determining if at least one bit from the one or more first upper channels is available if the assignment is associated with the one or more first upper channels; means for occupying the one of the plurality of symbol durations with the at least one bit from the one or more first upper channels if available; and means for occupying the one of the plurality of symbol durations with at least one bit from the one or more second upper channels or another first upper channel if not available, wherein the one or more first upper channels and the one or more second upper channels are different sets of upper channels; and means for disabling transmission of format information associated with the format combination.

Accordingly, an apparatus for communication over a downlink channel including a memory for storing at least one blind transport format detection (BTFD) hypothesis algorithm; means for enabling a blind transport format detection (BTFD) hypothesis testing mode; means for receiving one of a plurality of symbol durations on a physical channel; and means for attempting to decode the one of the plurality of symbol durations with a first hypothesis that a DCCH channel is not transmitted, wherein if attempting to decode with the first hypothesis is not successful, the means for attempting decodes the one of the plurality of symbol durations with a second hypothesis that the DCCH channel is transmitted.

Accordingly, a computer-readable medium storing computer executable code, operable on a device comprising a memory for storing at least one bit from one or more first upper channels or at least one bit from one or more second upper channels, and a processor coupled to the memory, the computer executable code including instructions for causing the processor to determine an assignment for one of a plurality of symbol durations in a format combination; instructions for causing the processor to determine if at least one bit from the one or more first upper channels is available if the assignment is associated with the one or more first upper channels; instructions for causing the processor to occupy the one of the plurality of symbol durations with the at least one bit from the one or more first upper channels if available; instructions for causing the processor to occupy the one of the plurality of symbol durations with at least one bit from the one or more second upper channels or another first upper channel if not available, wherein the one or more first upper channels and the one or more second upper channels are different sets of upper channels; and instructions for causing the processor to disable transmission of format information associated with the format combination.

Accordingly, a computer-readable medium storing computer executable code, operable on a device comprising a memory for storing at least one blind transport format detection (BTFD) hypothesis algorithm and a processor coupled to the memory, the computer executable code including instructions for causing the processor to enable a blind transport format detection (BTFD) hypothesis testing mode; instructions for causing the processor to receive one of a plurality of symbol durations on a physical channel; and instructions for causing the processor to attempt to decode the one of the plurality of symbol durations with a first hypothesis that a DCCH channel is not transmitted, and wherein if the attempt to decode with the first hypothesis is not successful, the instructions causes the processor to attempt to decode the one of the plurality of symbol durations with a second hypothesis that the DCCH channel is transmitted.

One or more aspects of the present disclosure may provide for an increase in a number of bits available for carrying voice packets, increased repetition, improved performance of frame early termination (FET), and increased efficiency of circuit switched voice transmissions over a downlink (DL) channel.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 illustrates an example of a pilot-free slot format for two vocoder rate examples at 5.9 kbps and 12.2 kbps according to some embodiments of the invention.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
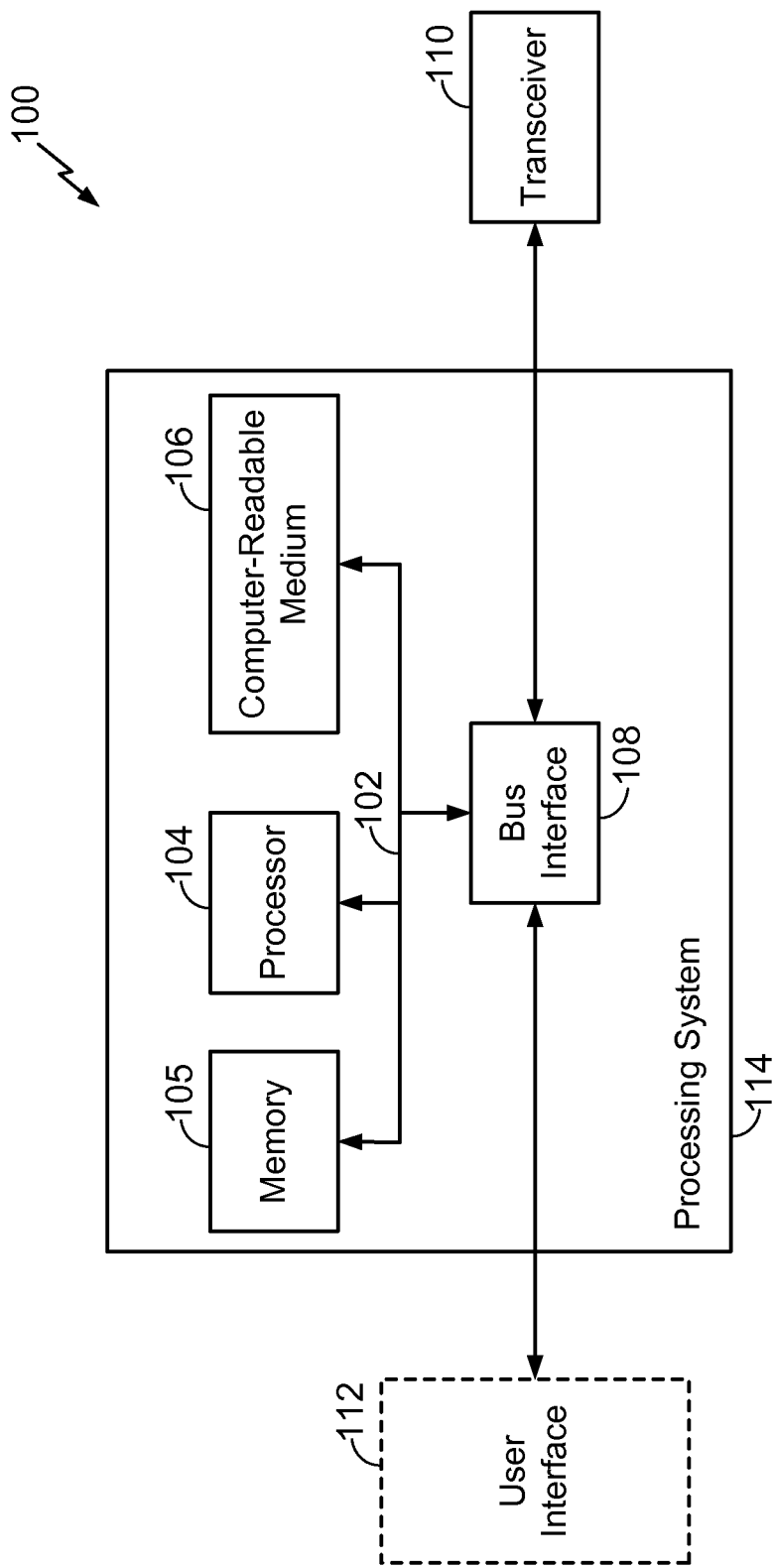
FIG. 1 is a diagram illustrating an example of a hardware implementation for an apparatus employing a processing system according to some embodiments of the invention.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2, 3, and/or 4. In another example, the apparatus 100 may be a Node B as illustrated in any one or more of FIGS. 2, 3, and/or 4. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes described below and illustrated in FIGS. 9 and/or 10.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
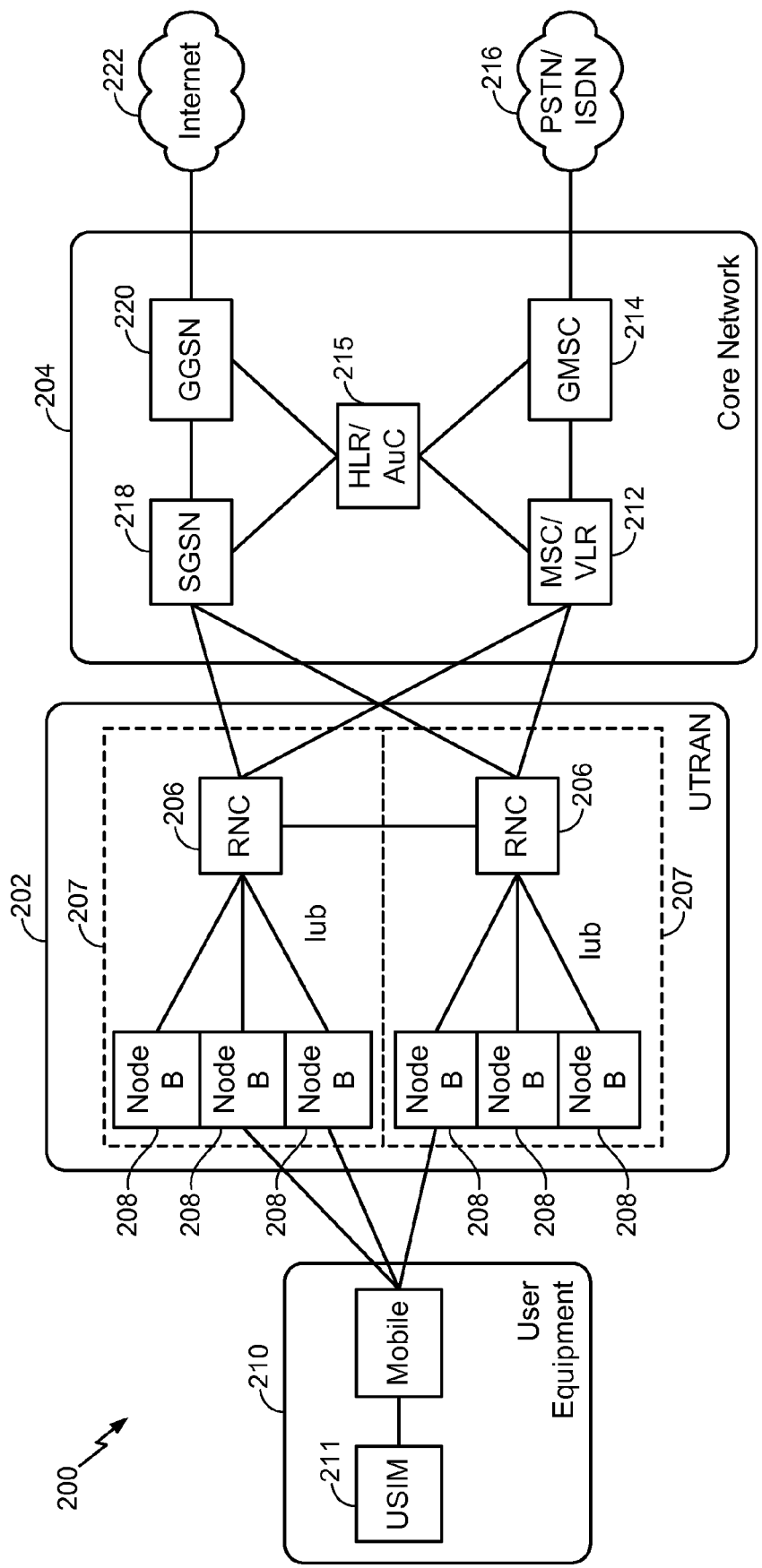
FIG. 2 is a block diagram conceptually illustrating an example of a telecommunications system according to some embodiments of the invention.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a Core Network 204, a Radio Access Network (RAN) (e.g., the UMTS Terrestrial Radio Access Network (UTRAN) 202), and User Equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the SRNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each SRNS 207; however, the SRNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The core network 204 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
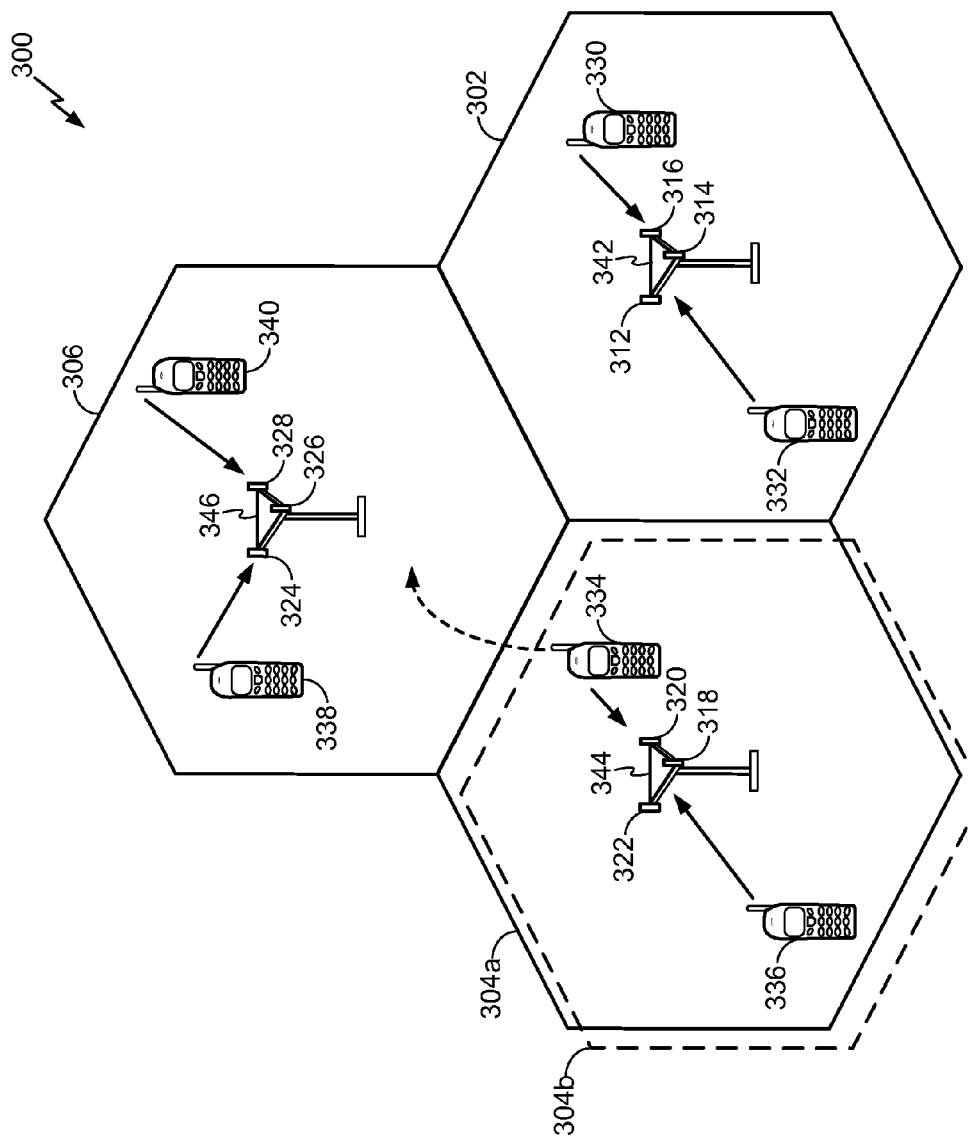
FIG. 3 is a conceptual diagram illustrating an example of an access network according to some embodiments of the invention.

The UTRAN 202 is an example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector.

The cells 302, 304 and 306 may include several UEs that may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 2) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells to which the UE 334 is simultaneously connected (i.e., the UTRAN cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employ CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. The actual wireless communication standard and the multiple access technology employed will depend on the specific application and the overall design constraints imposed on the system.

Figure 4:
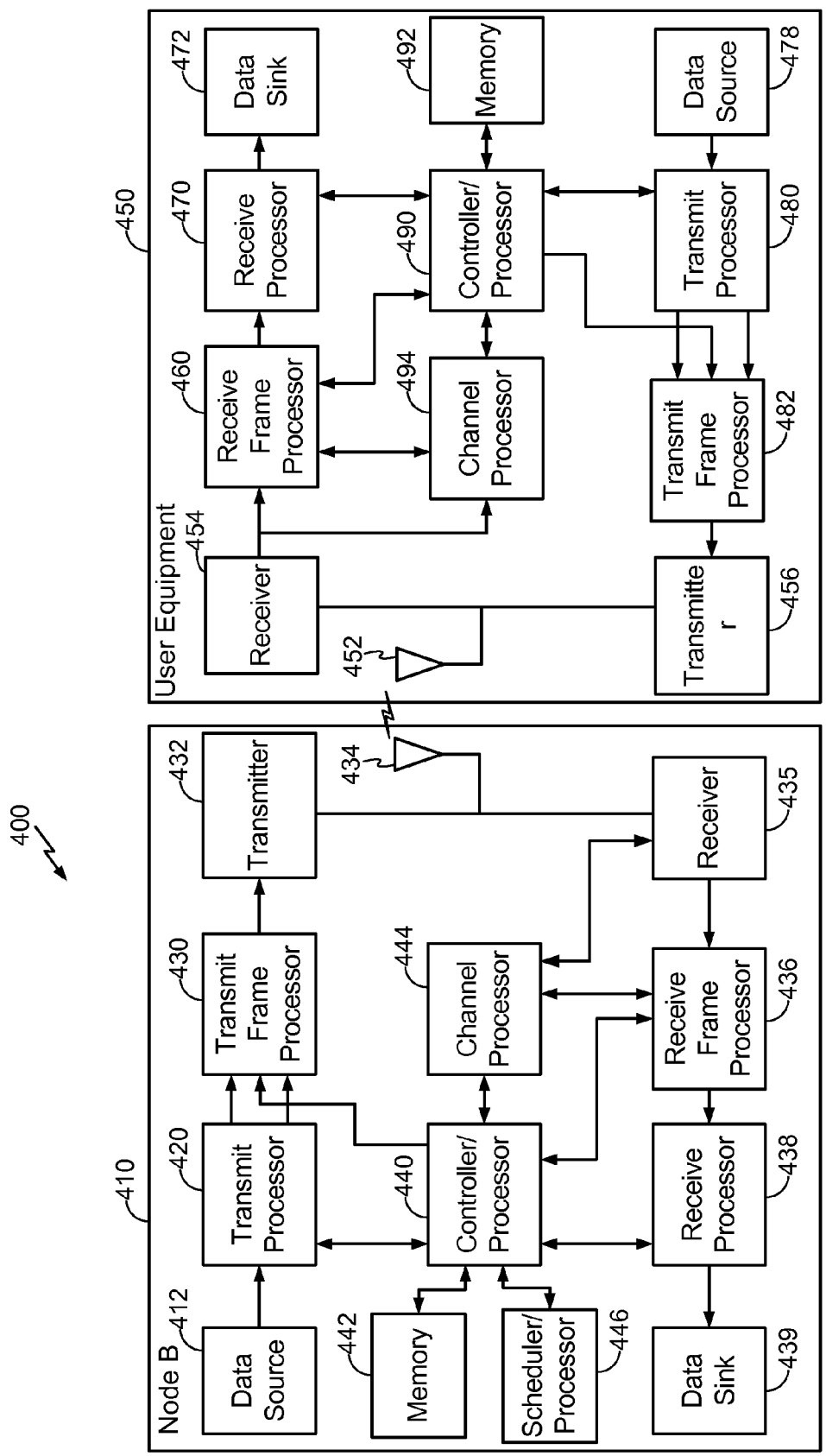
FIG. 4 is a block diagram conceptually illustrating an example of a Node B in communication with a UE in a telecommunications system according to some embodiments of the invention.

FIG. 4 is a block diagram of an exemplary Node B 410 in communication with an exemplary UE 450, where the Node B 410 may be the Node B 208 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Figure 5:
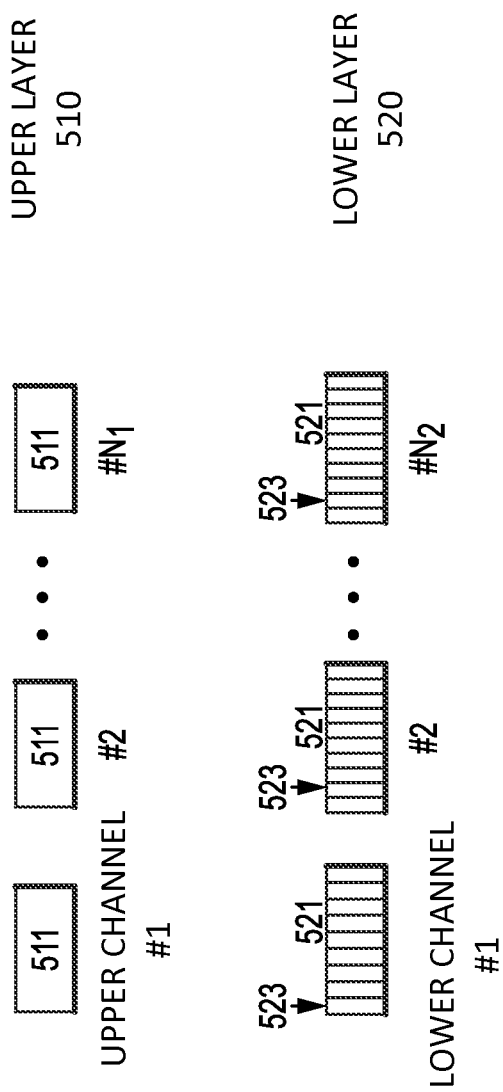
FIG. 5 is a block diagram conceptually illustrating an example of a wireless communication protocol layer architecture according to some embodiments of the invention.

FIG. 5 is a block diagram conceptually illustrating an example of a wireless communication protocol layer architecture for communication between the UE 210 and the UTRAN 202 (see FIG. 2). In various aspects, a wireless communication system may be decomposed into a hierarchy of protocol layers. For example, each layer may include one or more channels which provide a variety of functions. In general, a lower layer channel provides a service for a higher layer channel. In the example illustrated in FIG. 5, two layers are shown: an upper layer 510 and a lower layer 520. In the example of FIG. 5, the upper layer 510 includes $N_1$ upper channels 511 and the lower layer 520 includes $N_2$ lower channels 521. The values of $N_1$ and $N_2$ are arbitrary and may or may not be equal to each other.

In various aspects, the upper layer 510 provides upper channels, such as traffic channels and control channels, for either dedicated users or for common users. In various examples, the upper channels may be a Dedicated Traffic Channel (DTCH) or a Dedicated Control Channel (DCCH). For example, the upper layer 510 may include a DTCH and a DCCH. In various aspects, the lower layer 520 provides lower channels 521 for upper channels 511 for either or both downlink (i.e. Node B to user equipment) and uplink (i.e. user equipment to Node B) directions. In various examples, one or more of the lower channels 521 includes a plurality of symbol durations 523.

In various examples, the lower channels 521 are defined by the air interface of the wireless communication system, such as the modulation type, forward error correction code, interleaving scheme, lower layer framing, synchronization format, etc. For example, a lower channel may be a physical channel such as a Dedicated Physical Data Channel (DPDCH) or a Dedicated Physical Control Channel (DPCCH). In various examples, the lower layer 520 may include a DPDCH and a DPCCH.

Figure 6:
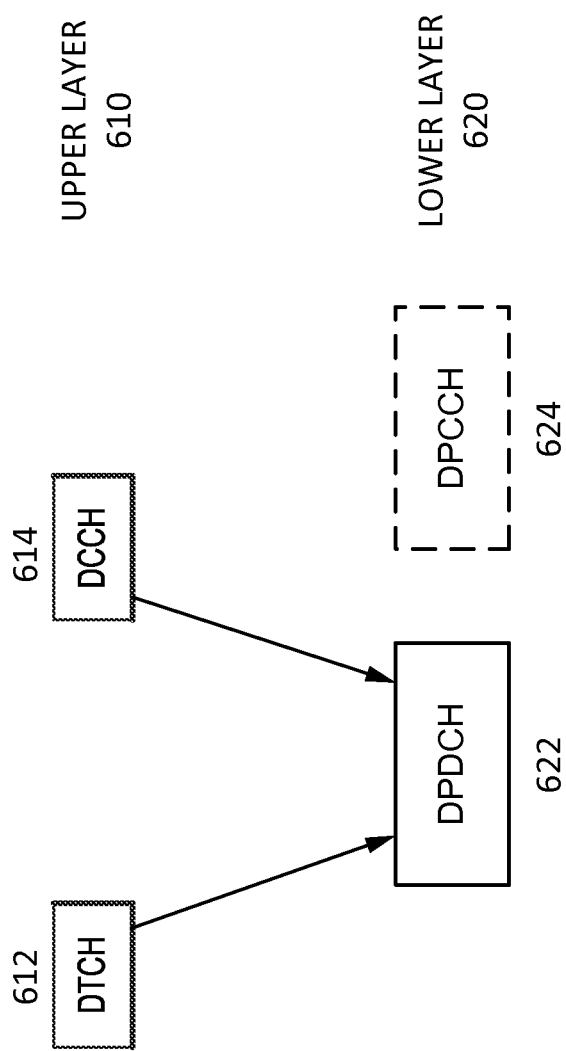
FIG. 6 is a block diagram conceptually illustrating the mapping of channels in the example of the wireless communication protocol layer architecture of FIG. 5 according to some embodiments of the invention.

FIG. 6 is a block diagram conceptually illustrating the mapping of channels in the example of the wireless communication protocol layer architecture of FIG. 5 according to some embodiments of the invention. In the example of FIG. 6, the protocol layer architecture includes two layers: an upper layer 610 and a lower layer 620. The upper layer 610 includes a Dedicated Traffic Channel (DTCH) 612 and a Dedicated Control Channel (DCCH) 614. The lower layer 620 includes a Dedicated Physical Data Channel (DPDCH) 622 and a Dedicated Physical Control Channel (DPCCH) 624.

Voice transport using a UMTS Release 99 (R99) downlink (i.e., forward direction) may use a fixed rate-matching (RM) mode. In the fixed rate-matching (RM) mode, the bit positions in the symbol duration assigned for Dedicated Control Channel (DCCH) bits cannot be re-used by Dedicated Traffic Channel (DTCH) bits even when there are no DCCH bits to be carried on the symbol duration within a lower channel. In reserving bit positions for the DCCH, the lower channel de-multiplexing operation does not need to be repeated for each blind transport format detection (BTFD) hypothesis. In some ways, this simplifies the complexity of the blind transport format detection (BTFD) procedure at the UE because it eliminates the need to repeat the lower channel de-multiplexing operation for each BTFD hypothesis.

In R99, a flexible rate-matching mode may also be used in lieu of the fixed rate-matching mode. The flexible rate-matching mode allows re-use of the bit positions in the symbol duration assigned to DCCH bits by DTCH bits when there are no DCCH bits to be carried on the symbol duration within the lower channel. However, with the re-use of the bit positions, the flexible rate-matching mode requires the transmission of a transport format combination indicator (TFCI) signal.

The present disclosure presents a pseudo-flexible rate-matching (RM) mode that extracts the merits of both the fixed RM mode and the flexible RM mode. A rate-matching (RM) attribute indicates the RM mode. In pseudo-flexible RM mode, one rate-matching (RM) attribute is signaled per transport channel, just as in fixed rate-matching. However, the physical layer transmission procedures are followed as if the RM attribute of the DCCH channel is set to zero if this DCCH channel does not deliver a transport block (i.e., does not deliver a group of bits). When no bits associated with the DCCH channel are delivered, the DTCH bits may use some or all of the bit positions that would have been assigned to bits associated with the DCCH channel in fixed rate-matching. To avoid change of RM attributes in the middle of ongoing packet transmissions, the setting of zero-value RM attribute can be disallowed for transport channels whose transmission time intervals (TTI) are smaller than the maximum TTI among all the configured transport channels.

Figure 7:
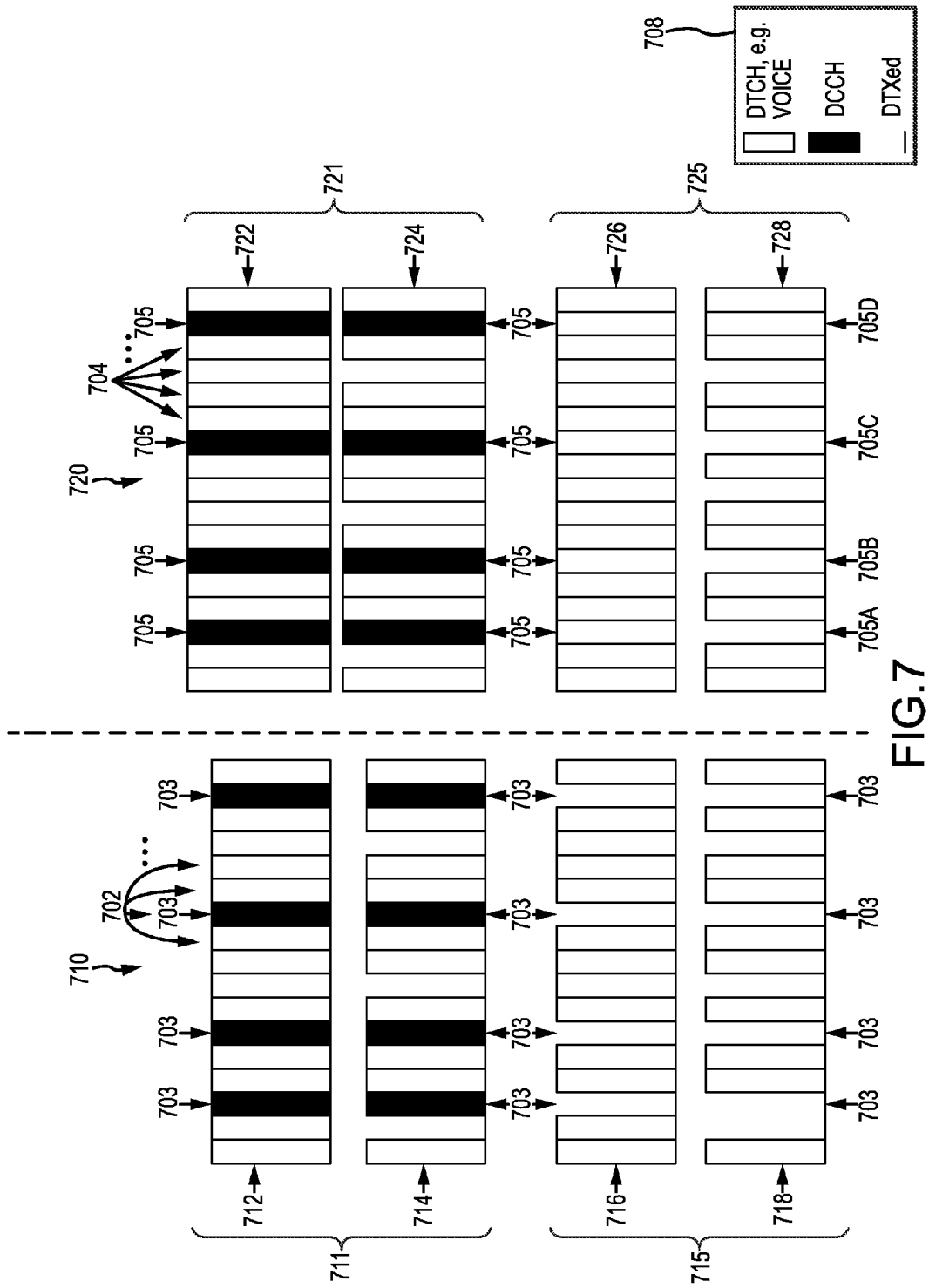
FIG. 7 illustrates a comparison example of a fixed rate-matching mode and a pseudo-flexible rate-matching mode at a lower layer according to some embodiments of the invention.

FIG. 7 illustrates a comparison example of a fixed rate-matching mode 710 and a pseudo-flexible rate-matching mode 720. The fixed rate-matching mode 710 includes two fixed scenarios: a first fixed scenario 711 and a second fixed scenario 715. The first fixed scenario 711 includes two format combinations: a 'full packet with DCCH bits' 712 and a 'null packet with DCCH bits' 714. The second fixed scenario 715 also includes two format combinations: a 'full packet with no DCCH bits' 716 and a 'null packet with no DCCH bits' 718. A format combination refers to a format that can be used for the transmission of bits The format combination may include multiple symbol durations. In various examples, a full packet means that the DTCH has no null packets; that is, all the symbol durations in the full packet are occupied with bits. And a null packet means that the DTCH includes at least one null packet; that is, at least one symbol duration is not occupied by a bit. Each of the two format combinations 712, 714, 716, 718 includes a plurality of symbol durations 702 which includes assigned DCCH symbol durations 703.

Key for FIG. 7 is labeled as 708. A black symbol duration indicates that it is occupied by DCCH bit(s). A white symbol duration indicates that is occupied by traffic bits (e.g., voice bits). A dashed line indicates that discontinuous transmission (DTX) is in effect; that is, no bits occupy (i.e., no bits are being transmitted) in that symbol duration. Additionally, in the first fixed scenario 711 and the second fixed scenario 715, '712' identifies a 'full packet with DCCH bits', '714' identifies a 'null packet with DCCH bits', '716' identifies a 'full packet with no DCCH bits', and '718' identifies a 'null packet with no DCCH bits'. In the first pseudo-flexible scenario 721 and a second pseudo-flexible scenario 725, '722' identifies a 'full packet with DCCH bits', '724' identifies a 'null packet with DCCH bits', '726' identifies a 'full packet with no DCCH bits' and '728' identifies a 'null packet with no DCCH bits'.

In the first fixed scenario 711, the DCCH bits occupy the assigned DCCH symbol durations 703 in the 'full packet with DCCH bits' 712 and the 'null packet with DCCH bits' 714. In the second fixed scenario 715, the assigned DCCH symbol durations 703 are not occupied in the 'full packet with no DCCH bits' 716 and the 'null packet with no DCCH bits' 718 since there are no DCCH bits. That is, in the fixed rate matching mode 710, the lower channel capacity cannot be reassigned between a plurality of upper channels. For example, the DTCH bits cannot use the assigned DCCH symbol durations 703 in the fixed rate matching mode 710 when there are no DCCH bits occupying the assigned DCCH symbol durations 703.

The pseudo-flexible rate-matching mode 720 includes two pseudo-flexible scenarios: a first pseudo-flexible scenario 721 and a second pseudo-flexible scenario 725. The first pseudo-flexible scenario 721 includes two format combinations: a 'full packet with DCCH bits' 722 and a 'null packet with DCCH bits' 724. The second pseudo-flexible scenario 725 also includes two format combinations: a 'full packet with no DCCH bits' 726 and a 'null packet with no DCCH bits' 728. Each of the two format combinations 722, 724, 726, 728 includes a plurality of symbol durations 704 which includes assigned DCCH symbol durations 705.

In the first pseudo-flexible scenario 721, the DCCH bits occupy the assigned DCCH symbol durations 705 in the 'full packet with DCCH bits' 722 and the 'null packet with DCCH bits' 724. In the second pseudo-flexible scenario 725, the assigned DCCH symbol durations 705 can be occupied in the 'full packet with no DCCH bits' 726 and the 'null packet with no DCCH bits' 728, for example, by DTCH bits. That is, in the pseudo-flexible rate matching mode 720, the lower channel capacity can be reassigned between a plurality of upper channels. For example, the DTCH bits can use the assigned DCCH symbol durations 705 in the pseudo-flexible rate matching mode 720 if there are no DCCH bits occupying the assigned DCCH symbol durations 705.

In the example illustrated in FIG. 7, the 'null packet with no DCCH bits' 728 includes 4 assigned DCCH symbol durations 705*a*, 705*b*, 705*c*, 705*d*. In this example, only one of the assigned DCCH symbol durations 705*d* is being occupied by DTCH bits while the other three assigned DCCH symbol durations 705*a*, 705*b*, 705*c* are left unoccupied. One skilled in the art would understand that any quantity (from none to all) of the assigned DCCH symbol durations 705 may be occupied, for example, by DTCH bits if they are not occupied by DCCH bits.

In various examples, the transmit power of the corresponding lower channel, for example DPDCH, is boosted to improve receive demodulator performance to compensate for the reduced number of lower channel bits when the DCCH bits occupy the assigned DCCH symbol durations 705. Since the power boost is applied only toward the corresponding lower channel, e.g. DPDCH, and not to another lower channel, e.g. DPCCH, an inner-loop power control scheme is unaffected by this lower layer modification. In another aspect, no lower channel signaling, e.g., DCCH indication bit, is required to notify the receiver of the presence or absence of DCCH bits in the symbol duration.

In various aspects, the pseudo-flexible rate-matching mode allows the reuse of assigned DCCH bit positions by DTCH channel bits when the DCCH channel is not available (e.g., when symbol durations in the upper channel are occupied). As a consequence, more lower channel bits, for example from the DPDCH, are available for use for the DTCH channel bits, thus allowing increased repetition and improved performance, for example, when frame early termination (FET) is used. Simultaneously, the increase in decoding complexity in the receiver, for example, the UE, is relatively modest.

In various examples, the receiver first decodes under the hypothesis that an upper channel is not transmitted, for example, the DCCH channel is not transmitted, and if the decoding is not successful, the receiver next decodes under the hypothesis that the upper channel is transmitted, for example, the DCCH channel is transmitted. In the alternative, the receiver can first decode under the hypothesis that the DCCH channel is transmitted, and if the decoding is not successful, the receiver next decodes under the hypothesis that the DCCH channel is not transmitted. When the DCCH channel is not transmitted, the RM attribute for the DCCH channel is treated as zero (i.e., a zero value) at the transmitter. At the receiver, under the "DCCH channel is transmitted" hypothesis, regular RM attributes are used, and under the "DCCH channel is not transmitted" hypothesis, the RM attribute of the DCCH channel is set to zero.

In another aspect, if early decoding is attempted, the hypothesis that the DCCH channel is transmitted needs to be tested only for a subset of the early decoding attempts. In various examples, this hypothesis may be tested only at the last attempt when the entire DTCH packet has been received. Under this hypothesis, both DTCH and DCCH must decode early for FET to be possible and this condition will be unlikely until most of the transmission has been completed. In various examples, since DCCH transmission is relatively rare, e.g. 1 to 2% of the time, the extra complexity of this scheme is relatively minimal. In this case, blind transport format detection (BTFD) is still possible without explicit signaling of the format, for example, via the TFCI signal.

In another aspect, whether or not the DCCH channel has been transmitted is automatically detected by the receiver based on which of the two hypotheses are successful. In this case, there is no need for in-band signaling of the presence of DCCH, for example, by using a DCCH indicator bit appended to the DTCH packet. In various examples, the demodulation performance of the DTCH channel may degrade during symbol durations where the DCCH channel is transmitted due to the reduced number of lower channel bits used to carry the DTCH packets, for example, from the DPDCH channel. In various examples, this performance degradation may be mitigated by a transmit power boost of the lower channel such as the DPDCH. Since the DCCH packets occur rarely, the long term average extra transmit power required for the transmit power boost is negligible. Moreover, since the transmit power boost is not applied to the DPCCH channel, this transmit power boost does not adversely affect any inner loop power control.

In various aspects, blind transport format detection (BTFD) may be used by a receiver to determine which one of a plurality of formats is used without the usage of explicit signaling by the transmitter. Explicit signaling may include specific indicator bits, such as the transport format combination indicator (TFCI) signal, for example. In various aspects, BTFD may be performed by the receiver using hypothesis testing. Hypothesis testing is a detection scheme where the receiver attempts to decode the received signal in a successive manner with a plurality of hypotheses on the transmit signal conditions, for example, whether or not a particular upper channel is transmitted. The receiver may assume a hypothesis of whether or not a DCCH is transmitted. The receiver enables a BTFD hypothesis testing mode by configuring its controller or processor to implement a hypothesis testing algorithm without the receipt of explicit signaling information on the format.

In various examples, a lower channel provides a lower service for a upper channel. In various aspects, the lower channel is comprised of a plurality of transmission time intervals (TTIs) with duration of 20 ms. The lower channel may use unique spreading codes, for example unique orthogonal variable spreading factor (OVSF) codes, for each UE to avoid the complications of managing the sharing of OVSF codes for different UEs using, for example, time division multiplexing (TDM). Also, the usage of a 20 ms TTI duration compared to the elemental 10 ms TTI duration has the advantage of improved time diversity for better interleaver performance in a fading transmission environment. In addition, the lower channel employs a pilot-free slot format which results in more lower channel bits available for the lower service for the upper channel, for example, a voice channel which employs a vocoder for efficient data compression. The pilot-free slot format is illustrated in FIG. 8. FIG. 8 illustrates an example of a pilot-free slot format for two vocoder rate examples at 5.9 kbps and 12.2 kbps. One skilled in the art would understand that other vocoder rates (besides the two examples shown in FIG. 8) may be used within the spirit and scope of the present disclosure.

Figure 9:
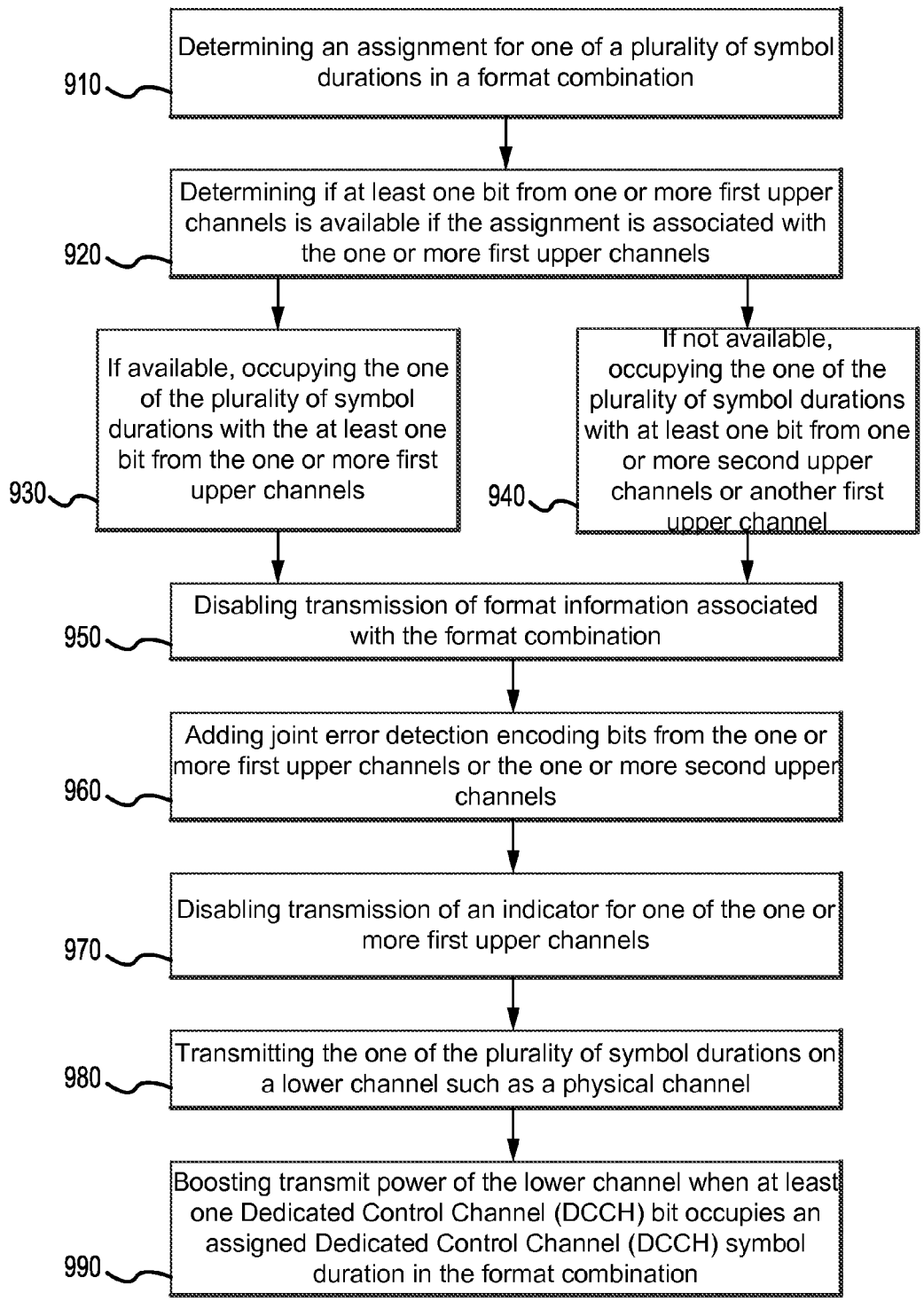
FIG. 9 is a flow diagram conceptually illustrating an example of communication over a downlink channel from a transmitter viewpoint according to some embodiments of the invention.

FIG. 9 is a flow diagram conceptually illustrating an example of communication over a downlink channel from a transmitter viewpoint. For example, for downlink communication, the transmitter may be a Node B as illustrated in FIGS. 1, 2, 3, and/or 4. Of course, in various aspects of the disclosure, the process illustrated in FIG. 9 may be operable at a processing system 114 as illustrated in FIG. 1, or at any suitable means for carrying out the functions described below. In block 910, the Node B 410 may determine an assignment for one of a plurality of symbol durations in a format combination. An assignment is a mapping of bits of an upper channel to one or more symbol durations of a lower channel. The assignment may correspond to which symbol durations in a format combination are occupied by bits of the corresponding upper channel, as described above. As used herein, the term symbol duration refers to a time interval during which a symbol may be transmitted. A symbol may comprise one or more bits for transmission, such as, for example, bits from an upper channel. For example, as illustrated in FIG. 7, each illustrated white rectangle, each illustrated black rectangle and each illustrated dash line represents a symbol duration. A black symbol duration (i.e., black rectangle) indicates that it is occupied by DCCH bit(s). A white symbol duration (i.e., white rectangle) indicates that is occupied by traffic bits (e.g., voice bits). A dashed line indicates that discontinuous transmission (DTX) is in effect; that is, no bits occupy (i.e., no bits are being transmitted) in that symbol duration.

In block 920, the Node B 410 may determine if at least one bit from one or more first upper channels is available if the assignment is associated with the one or more first upper channels. In various examples, the determining steps of blocks 910 and 920 are performed by a processor such as the controller/processor 440 shown in FIG. 4.

In block 930, the Node B 410 may, if available, occupy the one of the plurality of symbol durations with the at least one bit from the one or more first upper channels. In block 940, the Node B 410 may, if not available, occupy the one of the plurality of symbol durations with at least one bit from one or more second upper channels or another first upper channel. The one or more first upper channels and the one or more second upper channels are different sets of upper channels. In various examples, a first upper channel is a Dedicated Control Channel (DCCH) while a second upper channel is a Dedicated Traffic Channel (DTCH). In various examples, the occupying steps of blocks 930 and 940 are performed by a processor such as the transmit frame processor 430 shown in FIG. 4.

In block 950, the Node B 410 may disable transmission of format information associated with the format combination. As used herein, the term format combination refers to a format that can be used for the transmission of bits. In various examples, the format information is a transport format combination indicator (TFCI) signal. In various examples, the format information is stored in a memory coupled to a processor for performing the disabling step. In various examples, the disabling step is performed by the controller/processor 440 shown in FIG. 4.

In various aspects, an upper channel may carry (e.g., concatenate) a set of classes of bits. For example, voice traffic may include a set of classes of bits, such as classes A, B and C. In block 960, the Node B 410 may add joint error detection encoding bits and/or joint error correcting encoding bits from the one or more first upper channels or the one or more second upper channels. The added joint error detection encoding bits and/or joint error correcting encoding bits may include bits of all classes. In various examples, joint error detection encoding bits and/or joint error correcting encoding bits of all classes of bits from the one or more second upper channels are added. In various examples, a single DTCH channel carries a set of classes (e.g., all classes) of voice bits, one or more joint error detection encoding bit and one or more joint error correcting encoding bit.

In various examples, the joint error detection encoding bits are cyclic redundancy check (CRC) bits, e.g., 16 bit CRC. In various examples, the CRC bits may be used for blind transport format detection (BTFD) hypothesis testing by a receiver, for example, in a user equipment (UE) 450. In various examples, the first upper channel is a Dedicated Control Channel (DCCH). In various examples, the adding step is performed by a processor such as the transmit processor 420 shown in FIG. 4. In various examples, a single upper channel may carry cyclic redundancy check (CRC) bits for all traffic bits on that channel, and all those traffic bits are encoded with CRC bits together. Multiple upper channels may carry different classes of traffic bits, e.g. voice bits, each class with a separate CRC. Or, a single upper channel may carry all classes of traffic bits, e.g. voice bits, with a joint CRC for all classes of traffic bits.

In block 970, the Node B 410 may disable transmission of an indicator for one of the one or more first upper channels. In various examples, the one or more first upper channels is a control channel. In various examples, transmission of a DCCH indicator is disabled. The DCCH indicator is a bit that indicates the presence of the DCCH channel (i.e., the DCCH indicator indicates whether a DCCH channel transmits bits or does not transmit bits). In various examples, the disabling step is performed by the controller/processor 440 shown in FIG. 4. In another example, the steps of blocks 910 through 970 are performed by a single processor 104 or processing system 114 (see FIG. 1).

In block 980, the Node B 410 may transmit the one of the plurality of symbol durations on a lower channel, such as a physical channel. In various examples, the lower channel includes one or more transmission time intervals (TTIs). In various examples, the format of the lower channel is a pilot-free slot format. In various examples, the lower channel is a Dedicated Physical Data Channel (DPDCH). In various examples, the lower channel includes separate orthogonal variable spreading factor (OVSF) codes for a plurality of user equipment (UE). In various examples, the transmitting step is performed by the transmitter 432 shown in FIG. 4.

In block 990, the Node B 410 may boost transmit power of the lower channel when at least one Dedicated Control Channel (DCCH) bit occupies an assigned Dedicated Control Channel (DCCH) symbol duration in the format combination. In various examples, the boosting step is performed by the transmitter 432 shown in FIG. 4.

Figure 10:
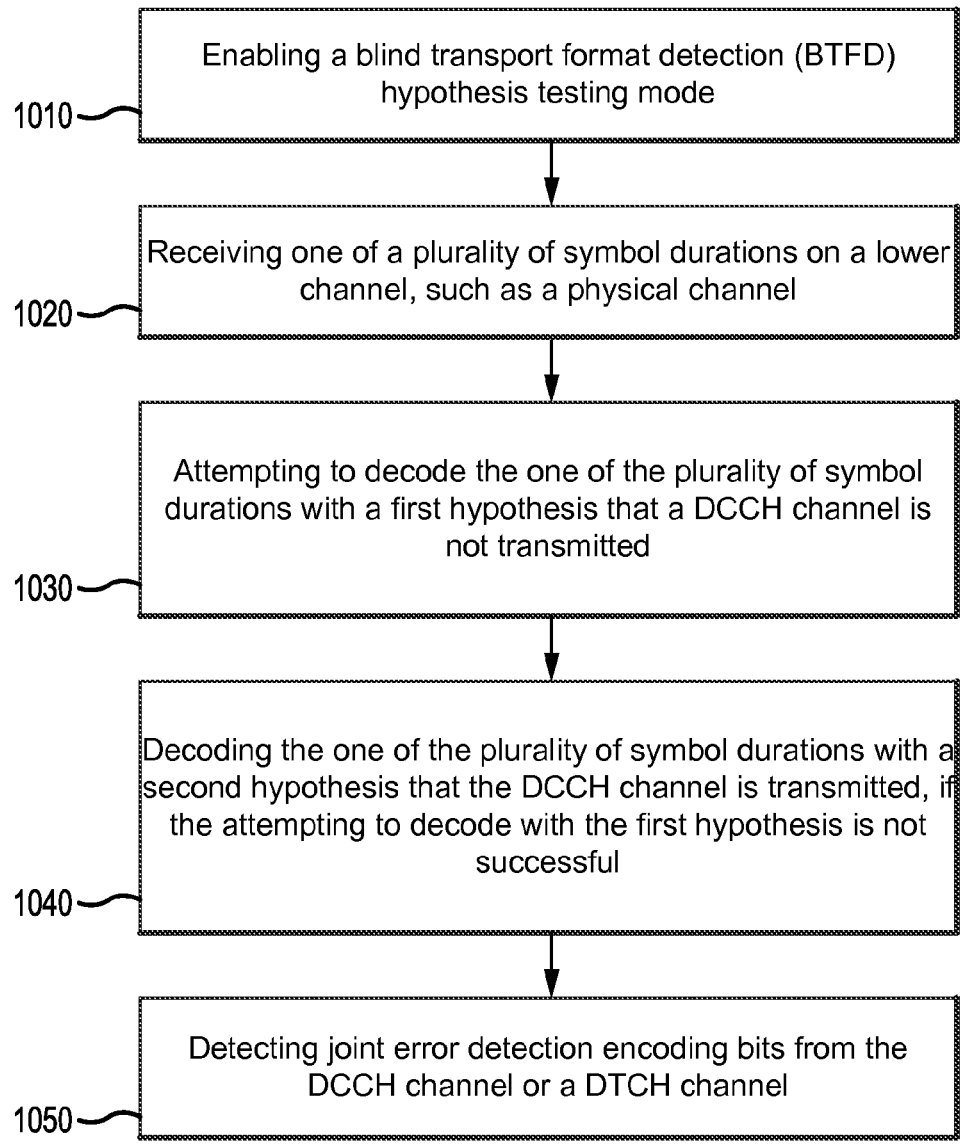
FIG. 10 is a flow diagram conceptually illustrating an example of communication over a downlink channel from a receiver viewpoint according to some embodiments of the invention.

FIG. 10 is a flow diagram conceptually illustrating an example of communication over a downlink channel from a receiver viewpoint. For example, for downlink communication, the receiver may be a UE as illustrated in FIGS. 1, 2, 3, and/or 4. Of course, in various aspects of the disclosure, the process illustrated in FIG. 10 may be operable at a processing system 114 as illustrated in FIG. 1, or at any suitable means for carrying out the functions described below. In block 1010, the UE 450 may enable a blind transport format detection (BTFD) hypothesis testing mode, for example, using at least one BTFD hypothesis algorithm. In various examples, the BTFD hypothesis algorithm is stored in a memory (e.g., the memory 105 in FIG. 1). In various examples, the BTFD hypothesis testing mode is enabled by a receiver by configuring a controller or a processor associated with the receiver to implement a hypothesis testing algorithm without the receipt of explicit signaling information on the format. In various examples, the enabling step is performed by the controller/processor 490 shown in FIG. 4.

In block 1020, the UE 450 may receive one of a plurality of symbol durations on a lower channel, such as a physical channel. In various examples, the lower channel includes one or more transmission time intervals (TTIs) with each TTI is of 20 ms duration. In various examples, the format of the lower channel is a pilot-free slot format. In various examples, the lower channel is a Dedicated Physical Data Channel (DP-DCH). In various examples, the lower channel includes separate orthogonal variable spreading factor (OVSF) codes for a plurality of user equipment (UE). In various examples, the receiving step is performed by the receive frame processor 460 shown in FIG. 4.

In block 1030, the UE 450 may attempt to decode the one of the plurality of symbol durations with a first hypothesis that a DCCH channel is not transmitted. That is, the first hypothesis is that the one of the plurality of symbol durations is occupied with at least one bit from a first upper channel. In various examples, the first upper channel is a Dedicated Traffic Channel (DTCH). In various examples, the attempting to decode step uses CRC bits. In various examples, the attempting to decode step is performed by the receive processor 470 shown in FIG. 4.

In block 1040, the UE 450 may decode the one of the plurality of symbol durations with a second hypothesis that the DCCH channel is transmitted. That is, the second hypothesis is that the one of the plurality of symbol durations is occupied with at least one bit from a second upper channel, if the attempting to decode with the first hypothesis (i.e., in block 1030) is not successful. In various examples, the second upper channel is a Dedicated Control Channel (DCCH). In various examples, the decoding step uses CRC bits. In various examples, the attempting to decode step is performed by the receive processor 470 shown in FIG. 4.

In block 1050, the UE 450 may detect joint error detection encoding bits from the DCCH channel or a DTCH channel. In various examples, the joint error detection encoding bits are cyclic redundancy check (CRC) bits, e.g., 16 bit CRC. In various examples, the second upper channel is a Dedicated Control Channel (DCCH).

The methods and apparatus disclosed in the present disclosure, including the processes disclosed in FIGS. 9 and 10, may be used to increase the efficiency of circuit-switched traffic (e.g., voice) transmission using a R99 downlink. The present disclosure may incorporate pilot-free-slot formats and early termination (FET) using existing 20 ms TTI. It may also use the disclosed pseudo-flexible rate-matching (RM) mode which combines the benefits of both the fixed RM mode and the flexible RM mode while avoiding many of their drawbacks. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communication over a downlink channel comprising:
   determining an assignment for one of a plurality of symbol durations in a format combination;
   determining if at least one bit from one or more first upper channels is available if the assignment is associated with the one or more first upper channels;

if available, occupying the one of the plurality of symbol durations with the at least one bit from the one or more first upper channels, and if not available, occupying the one of the plurality of symbol durations with at least one bit from one or more second upper channels or another first upper channel, wherein the one or more first upper channels and the one or more second upper channels are different set of upper channels; and disabling transmission of format information associated with the format combination.

2. The method of claim 1, wherein the one or more first upper channels comprises a Dedicated Control Channel (DCCH) channel and the one or more second upper channels comprises one or more Dedicated Traffic Channel (DTCH) channels.

3. The method of claim 2, wherein the one or more the DTCH channels carries different classes of voice bits.

4. The method of claim 2, further comprising disabling transmission of a DCCH indicator for the DCCH channel.

5. The method of claim 2, wherein a single DTCH channel carries a set of classes of voice bits, one or more joint error detection encoding bit and one or more joint error correcting encoding bit.

6. The method of claim 1 wherein a rate-matching (RM) attribute for one of the one or more first upper channel is treated as a zero value if no bit is available from the one of the one or more first upper channel.

7. The method of claim 1, further comprising transmitting the one of the plurality of symbol durations on a physical channel.

8. The method of claim 7, wherein the format of the physical channel is a pilot-free slot format, and wherein the physical channel comprises a plurality of separate orthogonal variable spreading factor (OVSF) codes for a plurality of user equipment (UE).

9. The method of claim 7, wherein one of the one or more first upper channels is a Dedicated Control Channel (DCCH), one of the one or more second upper channels is a Dedicated Traffic Channel (DTCH), the physical channel is a Dedicated Physical Data Channel (DPDCH), and further comprising boosting transmit power of the physical channel when at least one DCCH bit occupies at least one assigned DCCH symbol duration in the format combination.

10. An apparatus for communication over a downlink channel comprising:
a memory for storing at least one bit from one or more first upper channels or at least one bit from one or more second upper channels; and
at least one processor coupled to the memory, the at least one processor configured to perform the following:
determine an assignment for one of a plurality of symbol durations in a format combination;
determine if at least one bit from the one or more first upper channels is available if the assignment is associated with the one or more first upper channels;
if available, occupy the one of the plurality of symbol duration with the at least one bit from the one or more first upper channels and if not available, occupy the one of the plurality of symbol durations with at least one bit from the one or more second upper channels or another first upper channel,
wherein the one or more first upper channels and the one or more second upper channels are different sets of upper channels, and
disable transmission of format information associated with the format combination.

11. The apparatus of claim 10, wherein the one or more first upper channels comprises a Dedicated Control Channel (DCCH) channel and the one or more second upper channels comprises one or more Dedicated Traffic Channel (DTCH) channels.

12. The apparatus of claim 11, wherein the one or more the DTCH channels carries different classes of voice bits.

13. The apparatus of claim 11, wherein the at least one processor is further configured to disable transmission of a DCCH indicator for the DCCH channel.

14. The apparatus of claim 11, wherein a single DTCH channel carries a set of classes of voice bits, one or more joint error detection encoding bit and one or more joint error correcting encoding bit.

15. The apparatus of claim 10 wherein a rate-matching (RM) attribute for one of the one or more first upper channel is treated as a zero value if no bit is available from the one of the one or more first upper channel.

16. The apparatus of claim 10, wherein the at least one processor is further configured to transmit the one of the plurality of symbol durations on a physical channel.

17. The apparatus of claim 16, wherein the format of the physical channel is a pilot-free slot format, and wherein the physical channel comprises a plurality of separate orthogonal variable spreading factor (OVSF) codes for a plurality of user equipment (UE).

18. The apparatus of claim 16, wherein one of the one or more first upper channels is a Dedicated Control Channel (DCCH), one of the one or more second upper channels is a Dedicated Traffic Channel (DTCH), the physical channel is a Dedicated Physical Data Channel (DPDCH), and wherein the at least one processor is further configured to boost transmit power of the physical channel when at least one DCCH bit occupies at least one assigned DCCH symbol duration in the format combination.

19. An apparatus for communication over a downlink channel comprising:
a memory for storing at least one bit from one or more first upper channels or at least one bit from one or more second upper channels;
means for determining an assignment for one of a plurality of symbol durations in a format combination;
means for determining if at least one bit from the one or more first upper channels is available if the assignment is associated with the one or more first upper channels;
means for occupying the one of the plurality of symbol durations with the at least one bit from the one or more first upper channels if available; and
means for occupying the one of the plurality of symbol durations with at least one bit from the one or more second upper channels or another first upper channel if not available, wherein the one or more first upper channels and the one or more second upper channels are different sets of upper channels; and
means for disabling transmission of format information associated with the format combination.

20. A non-transitory computer-readable medium storing computer executable code, operable on a device comprising a memory for storing at least one bit from one or more first upper channels or at least one bit from one or more second upper channels, and a processor coupled to the memory, the computer executable code comprising:
instructions for causing the processor to determine an assignment for one of a plurality of symbol durations in a format combination;

instructions for causing the processor to determine if at least one bit from the one or more first upper channels is available if the assignment is associated with the one or more first upper channels;

instructions for causing the processor to occupy the one of the plurality of symbol durations with the at least one bit from the one or more first upper channels if available;

instructions for causing the processor to occupy the one of the plurality of symbol durations with at least one bit from the one or more second upper channels or another first upper channel if not available, wherein the one or more first upper channels and the one or more second upper channels are different sets of upper channels; and instructions for causing the processor to disable transmission of format information associated with the format combination.

\* \* \* \* \*